United States Patent Office 3,088,818
Patented May 7, 1963

3,088,818
BIS(TETRACHLOROETHYL) DISULFIDE
Emil J. Geering, Grand Island, N.Y., assignor to Hooker Chemical Corporation, Niagara Falls, N.Y., a corporation of New York
No Drawing. Filed Mar. 23, 1959, Ser. No. 800,933
8 Claims. (Cl. 71—2.7)

This invention relates to a new composition of matter and to methods of preparing and using this material. More specifically, this invention resides in a chemical composition, bis(tetrachloroethyl) disulfide.

The substance can be prepared in the following manner. One mole of sulfur monochloride is added to a cooled mixture of two or more moles of trichloroethylene and a catalytic quantity of a Lewis acid, such as aluminum chloride, ferric chloride, zinc chloride, etc. Upon completion of the reaction, the catalyst is removed by filtration. The filtrate is washed with water and then with a liquid that will destroy any dissolved or suspended catalyst, e.g., an alcohol. The product is isolated by removing excess solvent.

It was surprising and unexpected that the compound of this invention could be produced by the afore-mentioned reaction. One would predict on reviewing the prior art, that the reaction product of an aluminum chloride catalyzed addition of sulfur monochloride to trichloroethylene would be a monosulfide. It has been found, however, that a product which is essentially pure bis(tetrachloroethyl) disulfide can be prepared from these reactants provided that the specific conditions of this invention are followed. The preparation of the substantially pure bis-(tetrachloroethyl) disulfide of this invention by the interaction of trichloroethylene and sulfur monochloride was unknown in the prior art. When trichloroethylene is added to a mixture of aluminum chloride and sulfur monochloride, the product is reported as not being bis-(tetrachloroethyl) disulfide but rather (after dehydrochlorination) bis(trichlorovinyl) monosulfide. Again, the method of this invention comprises adding sulfur monochloride to a trichloroethylene-aluminum chloride mixture to get a substantially pure reaction product, bis(tetrachloroethyl) disulfide.

In carrying out the method of this invention the order of addition is critical. In order to obtain bis(tetrachloroethyl) disulfide as the sole product of the reaction, it is necessary to add the sulfur monochloride to the mixture of trichloroethylene and aluminum chloride. It is preferred to add the sulfur monochloride slowly to a cooled mixture of trichloroethylene and aluminum chloride. It is, of course, within the scope of the invention to use other Friedel-Crafts catalysts other than aluminum chloride. Upon completion of the reaction the usual procedures of removing catalyst from Friedel-Crafts reaction mixtures by hydrolysis may be employed. In the preferred method, however, the aluminum chloride or other Friedel-Crafts catalyst is removed by filtration. The filtrate is then washed with water and with an alcohol to remove traces of aluminum salts and complexes. Any mono- or polyfunctional alcohol that has the desired solubility and solubilizing characteristics may be used. However, it is preferable to employ a relatively volatile alcohol such as methanol or ethanol. The reaction mixture is dried by any of the appropriate methods that are known to the art, and the excess trichloroethylene, if present, and any dissolved alcohol are removed by reduced pressure stripping.

The product of this invention was identified by the following means. The sulfur and chlorine content was determined. These analyses corresponded to bis(tetrachloroethyl) disulfide. A sample of the compound of this invention was distilled and 90 percent was collected as distillate at 180 to 185 degrees centigrade at 3.2 millimeters. The material was analyzed for sulfur before and after distillation.

Analysis.—Calculated for $C_4H_2Cl_8S_2$: Cl, 71.3%; S, 16.1%. Found (before distillation): Cl, 71.2%; S, 16.0%. Found (after distillation): Cl, 70.8%; S, 16.1%.

These identical analyses of the distillation change and of the distillate demonstrate that the compound of this invention is a unique compound and, therefore, that it is not a mixture of sulfides having an average sulfur and chlorine analysis corresponding to the disulfide, and that it is not a mixture of elemental sulfur and the monosulfide having an average sulfur and chlorine analysis corresponding to the disulfide. Either of these mixtures might have been predicted to be the product of the reaction upon consideration of the prior art. It is a well-known fact that organic disulfides may be converted to sulfenyl chlorides by the action of chlorine. Tetrachloroethyl sulfenyl chloride was prepared in 84 percent yield by the chlorination of the product of this invention. The recovered starting material had a sulfur content of 15.9 percent which corresponds to bis(tetrachloroethyl) disulfide. This recovered material was converted, by further chlorination, to tetrachloroethyl sulfenyl chloride.

It is an object of this invention to provide a compound which has desirable pesticidal properties.

It is a further object of this invention to provide a compound which has desirable herbicidal properties.

A still further object of this invention is to provide a compound which will be useful as a chemical intermediate. Two compounds, for example, that may be made using bis(tetrachloroethyl) disulfide as an intermediate are tetrachloroethyl sulfenyl chloride and bis(trichlorovinyl) disulfide, both of which are the subject of copending applications.

The product of this invention has utility as a chemical intermediate, as a herbicide, and as a pesticide. Other uses will become apparent to those skilled in the art upon a reading of this disclosure. To warrant the use of a compound as an agricultural compound, in addition to being active as such, it should be among other things economical. The cost of an agricultural chemical must be commensurate with its activity. It is an object of this invention to provide an agricultural compound which is economical to manufacture.

Other objects will become apparent upon a further reading of the following disclosure.

This invention may be better illustrated by a reference to the following examples.

*Example I.—Preferred Preparation of Bis(Tetrachloroethyl) Disulfide*

To a stirred mixture of 5882 grams (44 moles) of trichloroethylene and 266 grams (2 moles) of powdered anhydrous aluminum chloride was added during three hours 2701 grams (20 moles) of sulfur monochloride. The reaction mixture was held at about five degrees centigrade during the addition. The mixture was filtered and the filtrate stirred with filter aid and refiltered. After washing the filtrate successively with water, dilute sodium carbonate solution and water, it was taken up in two liters of ethanol, oiled out by adding water dried over anhydrous calcium sulfate, and stripped of the excess trichloroethylene. The light yellow product weighed 6050 grams which is a yield of 93 percent.

Analysis.—Calculated for $C_4H_2Cl_8S_2$: Cl, 71.3%; S, 16.1%. Found: Cl, 71.2%; S, 16.0%.

The product has the following boiling points: 125–135° C./0.02–0.03 mm., 145–155° C./.04–0.5 mm., 180–185° C./3.2 mm. The product had a specific gravity of 1.785 at 23.3° C.

*Example II.—Pesticidal and Herbicidal Formulation*

A formulation composed of bis(tetrachloroethyl) disulfide, benzene, Triton X–100 (which is an alkyl aryl polyether alcohol) and water in the following proportions: 0.35, 1, 1, and 100 respectively was used in the following examples.

*Example III.—Pesticidal Use—Pea Aphids*

Ten adult pea aphids were sprayed and transferred to sprayed pea plants and held for forty-eight hour mortality determinations.

| Composition used: | Number dead |
|---|---|
| Bis(tetrachloroethyl) disulfide | 7 |
| Untreated (control) | 0 |

*Example IV.—Pesticidal Use—Southern Armyworm and Mexican Bean Beetle*

Lima bean leaves sprayed on the dorsal and ventral surfaces were offered to ten larvae of the southern armyworm (late third instar) and the Mexican bean beetle (late second instar) for a forty-eight hour feeding period.

| Composition Used | Number Killed | |
|---|---|---|
| | Southern Armyworm | Mexican Bean Beetle |
| bis(tetrachloroethyl) disulfide | 4 | 3 |
| untreated (control) | 0 | 0 |

*Example V.—Herbicidal and Pesticidal Use— Phytotoxicity and Spider Mite*

Lima bean plants were infested with one hundred adults of the strawberry spider mite species, *Tetranychus atlanticus*, prior to testing. The infested plants were dipped into the formulation and held for five days. The percent spider mite killed and the foliage injury was observed as follows:

| Composition Used | Number Spider Mites Killed, percent | Foliage Injury, Percent Phytotoxic |
|---|---|---|
| bis(tetrachloroethyl) disulfide | 90 | 75 |
| untreated (control) | 0 | 0 |

Although it has been specified throughout this disclosure that bis(tetrachloroethyl)disulfide is the new composition of matter, it of course would not deviate from the spirit of this invention for one to use bis(tetrahaloethyl) disulfide. The examples of the composition of this invention, and methods of preparing and utilizing it which have been described in the foregoing specification, have been given for purposes of illustration, not limitation. Many other modifications and ramifications will naturally suggest themselves to those skilled in the art, based on the disclosure of my basic discovery. These are intended to be comprehended within the scope of my invention.

I claim:

1. Bis(tetrachloroethyl) disulfide.

2. A process for preparing bis(tetrachloroethyl) disulfide which comprises adding sulfur monochloride to a mixture of trichloroethylene and aluminum chloride maintained at a temperature below about five degrees centigrade, hydrolyzing the reaction mixture, and recovering the bis(tetrachloroethyl) disulfide formed.

3. A process for preparing bis(tetrachloroethyl) disulfide which comprises adding sulfur monochloride to trichloroethylene in the presence of an aluminum chloride catalyst, filtering off the catalyst, washing to dissolve any suspended catalyst, and recovering the product formed.

4. The method for regulating the growth of plants which comprises applying to the media to be treated a composition comprising as an active ingredient bis(tetrachloroethyl) disulfide.

5. The method of killing insects which comprises exposing said insects to a toxic quantity of bis(tetrachloroethyl) disulfide.

6. The method of killing insects which comprises treating plant life with at least a toxic quantity of bis(tetrachloroethyl) disulfide.

7. A process for the preparation of bis(tetrachloroethyl) disulfide which comprises adding sulfur monochloride to a mixture of trichloroethylene and aluminum chloride maintained at a temperature below about five degrees centigrade.

8. A process for the preparation of bis(tetrachloroethyl) disulfide which comprises adding sulfur monochloride to trichloroethylene in the presence of aluminum chloride catalyst at a temperature of about five degrees centigrade, filtering off the catalyst, washing to dissolve any suspended catalyst, and recovering the bis(tetrachloroethyl) disulfide formed.

References Cited in the file of this patent

UNITED STATES PATENTS

| 2,396,788 | Hoffman | Mar. 19, 1946 |
| 2,451,411 | Raasch | Oct. 12, 1948 |